United States Patent
Hur

(10) Patent No.: US 7,287,111 B2
(45) Date of Patent: Oct. 23, 2007

(54) METHOD AND SYSTEM FOR CREATING AND DYNAMICALLY SELECTING AN ARBITER DESIGN IN A DATA PROCESSING SYSTEM

(75) Inventor: Ibrahim Hur, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 10/948,408

(22) Filed: Sep. 23, 2004

(65) Prior Publication Data

US 2006/0064532 A1    Mar. 23, 2006

(51) Int. Cl.
G06F 12/00 (2006.01)
G06F 13/14 (2006.01)
G06F 13/38 (2006.01)
G06F 3/00 (2006.01)
G06F 13/36 (2006.01)
G06F 13/00 (2006.01)
G06F 13/28 (2006.01)

(52) U.S. Cl. ............... 710/244; 710/240; 710/241; 710/41; 710/116; 711/151; 711/154; 711/158; 711/168

(58) Field of Classification Search ........ 710/242–244, 710/309, 41, 116, 240, 241; 703/16, 17, 703/23–28; 711/151, 154, 158, 168
See application file for complete search history.

(56) References Cited

U.S. PATENT DOCUMENTS

| | | | | | |
|---|---|---|---|---|---|
| 5,265,257 A | * | 11/1993 | Simcoe et al. | ............... | 710/263 |
| 5,392,033 A | * | 2/1995 | Oman et al. | ............. | 340/825.5 |
| 5,448,701 A | * | 9/1995 | Metz et al. | .................. | 710/113 |
| 5,758,105 A | * | 5/1998 | Kelley et al. | ............... | 710/113 |
| 5,875,339 A | * | 2/1999 | Molnar et al. | ............. | 710/240 |
| 6,006,303 A | * | 12/1999 | Barnaby et al. | ............ | 710/244 |
| 6,286,083 B1 | * | 9/2001 | Chin et al. | ................... | 711/151 |
| 6,687,821 B1 | * | 2/2004 | Hady et al. | ................. | 713/100 |
| 6,738,881 B1 | * | 5/2004 | Ollivier et al. | ............ | 711/168 |
| 6,792,516 B2 | * | 9/2004 | Mastronarde et al. | ....... | 711/158 |
| 6,804,736 B2 | * | 10/2004 | Olarig | ........................ | 710/240 |
| 6,804,738 B2 | * | 10/2004 | Weber | ........................ | 710/244 |
| 6,985,985 B2 | * | 1/2006 | Moss | ........................ | 710/240 |
| 2002/0069310 A1 | * | 6/2002 | Scandurra et al. | .......... | 710/240 |
| 2004/0100982 A1 | * | 5/2004 | Balasubramanian | ........ | 370/429 |
| 2004/0103232 A1 | * | 5/2004 | Clayton | ..................... | 710/244 |
| 2005/0273564 A1 | * | 12/2005 | Lakshmanamurthy et al. | ........................ | 711/158 |

OTHER PUBLICATIONS

Kwon et al., "Bandwidth Tracing Arbitration Algorithm for Mixed-Clock SoC with Dynamic Priority Adaptation", 2004, IEEE, Proceedings of the 2004 conference on Asia South Pacific design automation: electronic design and solution fair, pp. 806-811.*
Weber, Matt, "Arbiters: Design Ideas and Coding Styles", 2001, Silicon Logic Engineering, Inc.*

* cited by examiner

Primary Examiner—Mark H. Rinehart
Assistant Examiner—Faisal Zaman
(74) Attorney, Agent, or Firm—Casimer K. Salys; Dillon & Yudell LLP

(57) ABSTRACT

A method, system and computer program product for creating and dynamically selecting an arbiter design within a data processing system on the basis of command history is disclosed. The method includes selecting a first arbiter for current use in arbitrating between requestors for a resource. During operation of said data processing system, an arbiter selection unit detects requests for the resource and selects a second arbiter in response to the detected requests for the resource.

32 Claims, 7 Drawing Sheets

METHOD AND SYSTEM FOR CREATING AND DYNAMICALLY SELECTING AN ARBITER DESIGN IN A DATA PROCESSING SYSTEM

BACKGROUND OF THE INVENTION

1. Technical Field

The present invention relates in general to data processing and in particular to creating and selecting an arbiter within a data processing system. Still more particularly, the present invention relates to a system, method and computer program product for creating and dynamically selecting an arbiter design within a data processing system on the basis of command history.

2. Description of the Related Art

In many components on a data processing system, the speed at which commands arrive at the component exceeds the speed at which commands can be processed by the component. Examples of this problem include an arbiter within a memory controller, though many system components exhibit similar receipt-to-execution bottlenecks. In the case of arbiters, the continuously-widening gap between processor speeds and memory latencies increases the pressure for better memory controller designs, and, in particular, increases the need for better arbiters within memory controllers.

An arbiter is a component of a memory controller or other device, which is responsible for the ordering of commands or requests before they are forwarded to a receiving device. Arbiter design addresses two main issues. The first issue addressed is the ongoing attempt to transmit commands to a target in an order similar the order in which they are generated by senders. The second issue is maximizing command bus and data bus utilization by determining appropriate design parameters and by minimizing delays between memory commands. Suboptimal ordering of commands will introduce unnecessary delays, poorly utilize data and command buses, cause retry operations because of unbalanced processing of commands, and therefore will degrade the overall system performance.

What is needed is an approach, including a method of arbiter design and a method of arbiter selection, that addresses both issues systematically and attempts to create and select an optimal arbiter by considering both issues concurrently.

SUMMARY OF THE INVENTION

A method, system and computer program product for designing and dynamically selecting an arbiter design within a data processing system on the basis of command history is disclosed. The method includes selecting a first arbiter for current use in arbitrating between requestors for a resource. During operation of said data processing system, an arbiter selection unit detects requests for the resource and selects a second arbiter in response to the detected requests for the resource.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1A:
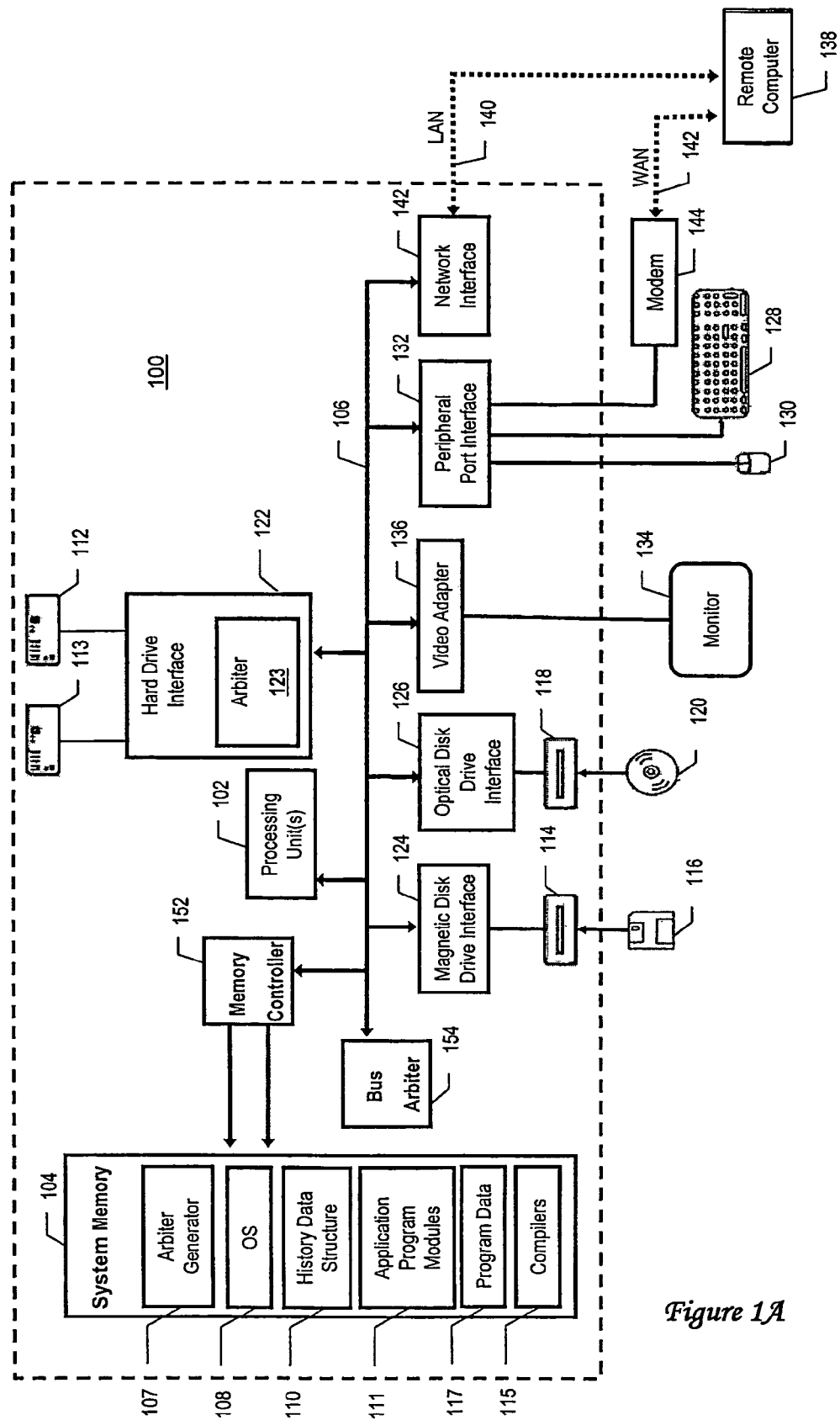
FIG. 1A illustrates an exemplary data processing system containing multiple arbiters, in which data processing system a preferred embodiment of the method, system and computer program product for designing and dynamically selecting an arbiter design in a data processing system are implemented.

With reference now to figures and in particular with reference to FIG. 1A, there is depicted a data processing system 100 that may be utilized to implement the method and system of the present invention. For discussion purposes, the data processing system is described as having features common to a personal computer, such as a desktop or portable computer. However, as used herein, the term "data processing system," is intended to include any type of computing device or machine that is capable of receiving, storing and running a software product, including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the present invention. While parts of the invention will be described in the general context of instructions residing on hardware within a personal computer, those skilled in the art will recognize that the invention also may be implemented in a combination of program modules running on an operating system. Generally, program modules include routines, programs, components and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Data processing system 100 includes one or more processing units 102, a system memory 104, and a system interconnect fabric 106 that couples system memory 104 to processing unit(s) 102 and other components of data processing system 100. Commands on system interconnect fabric 106 are communicated to various system components under the control of bus arbiter 154.

Data processing system 100 further includes a first hard disk drive 112 and a second hard disk drive 113, a magnetic disk drive 114, e.g., to read from or write to a removable disk 116, and an optical disk drive 118, e.g., for reading from or writing to optical media 120. First hard disk drive 112 and second hard disk drive 113, magnetic disk drive 114, and optical disk drive 118 are communicatively coupled to system interconnect fabric 106 by a hard disk drive interface 122, containing an arbiter 123 for arbitrating between communications directed to first hard disk drive 112 and second hard disk drive 113, a magnetic disk drive interface 124, and an optical drive interface 126, respectively. The drives and their associated computer-readable media provide nonvolatile storage for data processing system 100. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and other later-developed hardware, may also be used in the exemplary computer operating environment.

A user may enter commands and information into data processing system 100 through a keyboard 128 and pointing device, such as a mouse 130. Other input devices (not shown) may include a microphone, joystick, game pad, satellite dish, or a scanner. These and other input devices are often connected to processing unit 102 through a peripheral interface 132 that is coupled to system interconnect fabric 106, such as a universal serial bus (USB). A monitor 134 or other type of display device is also connected to system interconnect fabric 106 via an interface, such as a video adapter 136. In addition to the monitor, personal computers typically include other peripheral output devices (not shown), such as speakers or printers.

Data processing system 100 may operate in a networked environment using logical connections to one or more remote computers, such as a remote computer 138. The remote computer 138 may be a server, a router, a peer device or other common network node, and typically includes many or all of the elements described relative to data processing system 100. The logical connections depicted in FIG. 1A include connections over a local area network (LAN) 140 and a wide area network (WAN) 142.

When used in a LAN networking environment, data processing system 100 is connected to LAN 140 through a network interface 142. When used in a WAN networking environment, data processing system 100 typically includes or is coupled to a modem 144 or other means for establishing communications over WAN 142, such as the Internet. The modem 144, which may be internal or external, is connected to system interconnect fabric 106 via peripheral interface 132. In a networked environment, program modules depicted relative to data processing system 100, or portions thereof, may be stored in the remote memory storage device. It will be appreciated that the network connections shown are exemplary and other means of establishing a communications link between the computers may be used.

System memory 104 contains an arbiter generator 107, an operating system 108, and a command history data structure 110. Other software and data structures may be stored in system memory 104, such as application program modules 111, compilers 115, and program data 117.

Figure 1B:
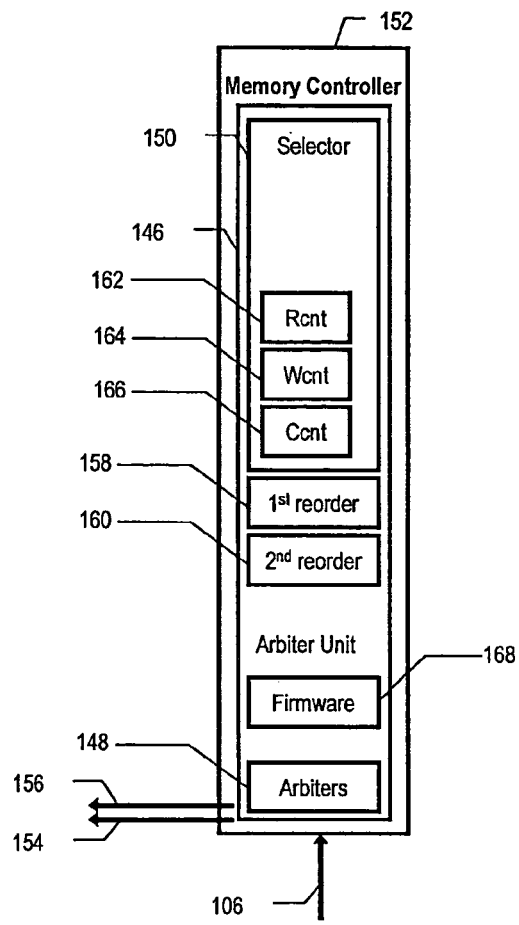
FIG. 1B depicts a memory controller containing an arbiter-selection unit, in which a preferred embodiment of the method, system and computer program product for dynamically selecting an arbiter design in a data processing system are implemented.

Turning now to FIG. 1B, a memory controller containing an arbiter-selection unit, in which a preferred embodiment of the method, system and computer program product for dynamically selecting an arbiter design in a data processing system are implemented, is depicted. Memory controller 152, which is coupled to system interconnect fabric 106 and controls access to system memory 104 by system components, such as processing units 102, also includes an arbiter unit 146. Arbiter unit 146 contains one or more arbiters 148 and a selector 150. There may be multiple ports between memory controller 152 and system memory 104, such as first port 154 and second port 156. System memory 104 contains memory chips consisting of banks and ranks (bank groups), which are addressable by memory controller 152. Memory controller 152 has the ability to compute the port, bank, and rank numbers of commands.

Memory controller 152 contains two reorder queues, first reorder queue 158 and second reorder queue 160, which temporarily store the commands coming from processing units 102 before they are forwarded to memory. First reorder queue 158 and second reorder queue 160 are called reorder queues, because the order of the commands coming in and going out from these queues may change depending on some optimization criteria. For example, in a system where bank conflicts cause long delays, some commands in reorder queues may be blocked until conflicts related to those commands are resolved. Arbiter unit 146, when used in conjunction with reorder queues in memory controller 152 and memory chips in system memory 104, determines the next command to be sent to memory. Reorder queues feed arbiter unit 146 with candidate commands and arbiters 148 choose, with respect to some performance criteria, the most appropriate command for transmission.

Arbiter selector 150 contains two user-accessible counters for use within memory controller 152, a read counter 162, Rcnt, and a write counter 164, Wcnt, to track the number of Reads and Writes received from processing units 102, respectively. The ratio of the values in these counters guides selector 150 in selecting a most appropriate arbiter. A command counter 166, Ccnt, counts the number of cycles elapsed since the last arbiter selection. Selector 150 checks the values of Rcnt and Wcnt at every Ccnt cycles to select a new arbiter for the next Ccnt cycles. Selector 150 implements the following six counter operations: 1) Write an integer into Rcnt, Wcnt, or Ccnt, 2) Increment Rcnt, Wcnt by 1, 3) Decrement Ccnt by 1, 4) Reset values of both Rcnt and Wcnt to 1, 5) Disable any further update to either Rcnt or Wcnt, and 6) Enable updates to Rcnt and Wcnt. Counter operations, except for decrement of Ccnt, are included in the instruction set of processing unit(s) 102. Arbiter unit 150 also contains firmware 168 for storing setup information and instructions.

Arbiter generator 107 employs, responsive to received commands, a design process to design arbiters 148 for use in arbiter unit 146, determining and adjusting various relevant design parameters. Arbiter generator 107 employs a probabilistic algorithm to design arbiters 148 that will minimize the overall delay between consecutive memory commands. Arbiter generator 107 calculates the aggregate effect of commands in total delay and then uses the calculated delay to design appropriate arbiters 148. The calculation process of arbiter generator 107 is probabilistic in the sense that it can use different optimization criteria with different probabilities. Once provided with the pattern of Reads/Writes sent to a memory controller, arbiter generator 107 can design an arbiter to process that pattern optimally. Arbiter generator 107 can be employed as part of the process for of designing a new data processing system, in which case static arbiters 148 would be present in the data processing system, or arbiter generator can be used dynamically to create and adjust arbiters on data processing system 100 during use.

However, Read/Write patterns change from one program to another, causing any optimal arbiter for one command pattern to be a suboptimal arbiter for some other command patterns. Therefore, the present invention supports multiple arbiters 148 in arbiter unit 146 of memory controller 152 and a selector 150 that selects the most appropriate arbiter among arbiters 148 dynamically. Selector 150 can employ three alternative methods for selecting the most appropriate arbiter: a software-based approach, a hardware-based approach, or a hybrid approach. These implementations first determine the memory command pattern of the program statically and/or dynamically, and then use that pattern information to select an appropriate arbiter 148.

As described above, several arbiters exist within data processing system 100. Arbiters within data processing system 100 include an arbiter unit 146 within memory controller 152, bus arbiter 154 and arbiter 123 within hard disk interface 122. While a preferred embodiment of the present invention will be explained with respect to arbiter unit 146 within memory controller 152, present invention can be implemented with respect to any arbiter within data processing system 100.

Figure 1C:
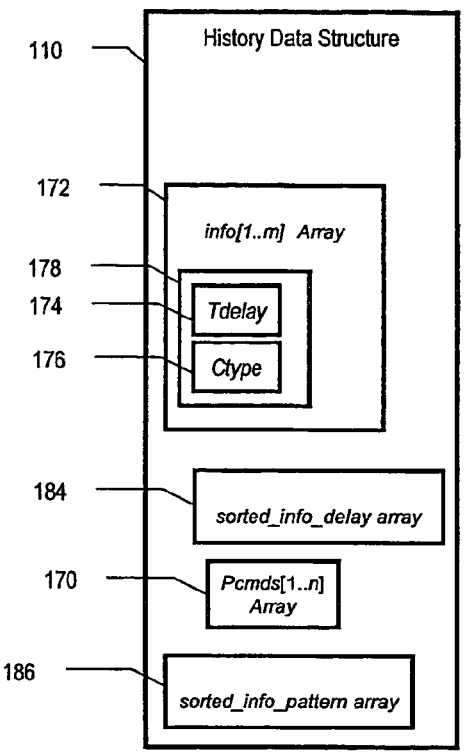
FIG. 1C illustrates a history data structure use in implementing a method, system and computer program product for designing an arbiter in a data processing system in accordance with a preferred embodiment of the present invention.

With reference now to FIG. 1C, a history data structure in accordance with a preferred embodiment of the present invention is depicted. History data structure 110 contains, among other possible components which will be immediately apparent to one skilled in the art and are omitted from the diagram for simplicity, four arrays. A Pcmds[1..n] array 170 represents the last n commands sent to memory. Pcmds[1] holds the oldest command and Pcmds[n] holds the most recent command. An info[1..m] array 172, contains at least one element 178, which has two fields, Tdelay 174 and Ctype 176. Both of these fields are populated with integers, and Tdelay 174 has the total delay if a command of type Ctype 176 is sent to memory as the next command. A sorted_info_delay array 184 stores elements of the info [1..m] array 172, sorted by total delay first and deviation from the pattern next. Similarly, a sorted_info_pattern array 186 stores elements from info[1..m] array 172, sorted first by pattern information and then by total delay.

Figure 1D:
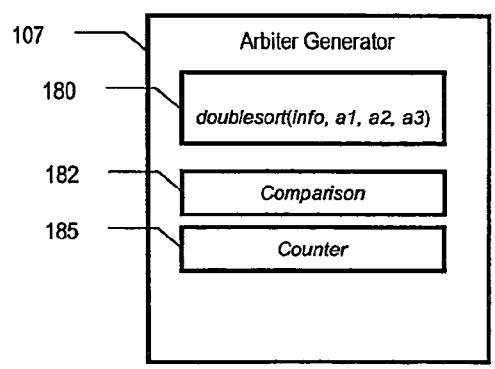
FIG. 1D depicts a simplified arbiter generator in accordance with a preferred embodiment of the present invention.

Turning now to FIG. 1D, a simplified arbiter generator in accordance with a preferred embodiment of the present invention is illustrated. Arbiter generator 107 contains, among other possible components which will be immediately apparent to one skilled in the art and are omitted from the diagram for simplicity, three routines. A doublesort(info, a1, a2, a3) function 180 sorts elements of info[1..m] array 172 using first the a1 field and next the a2 field by a3{<,>} the comparison function 182. Comparison function 182 determines whether sorted elements are sorted in ascending or descending order. Arbiter controller 107 also contains a counter 185.

Figure 2:
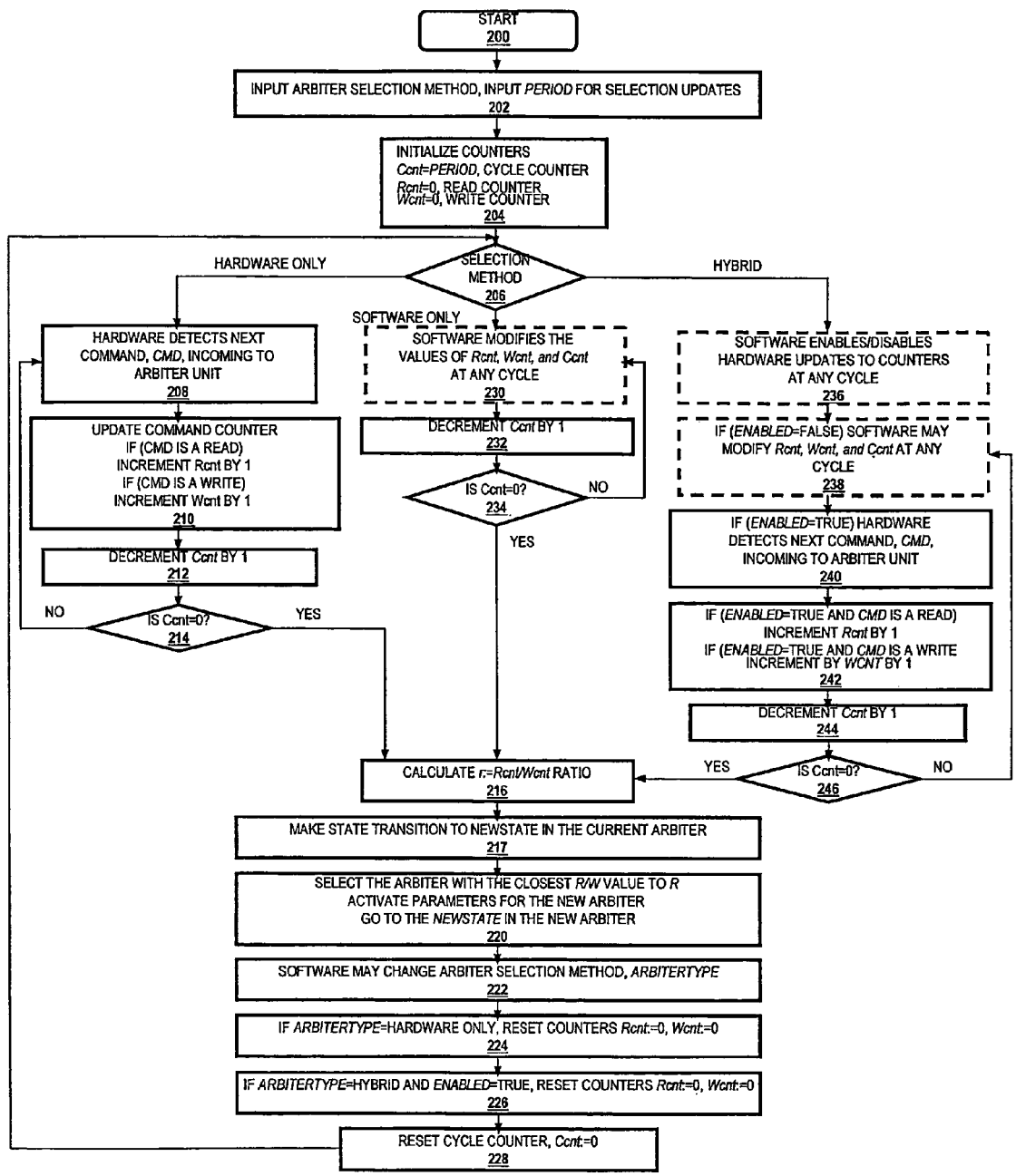
FIG. 2 is a high-level logical flowchart of a process for dynamically selecting an arbiter design in a data processing system in accordance with a preferred embodiment of the present invention.

Turning now to FIG. 2, a high-level logical flowchart of a process for dynamically selecting an arbiter design in a data processing system in accordance with the preferred embodiment of the present invention is depicted. The process begins at step 200, which illustrates activation of an arbiter selector 150 within arbiter unit 146 of data processing system 100. The process then moves to step 202, which illustrates arbiter selector 150 receiving as input, from firmware 168 within arbiter unit 150 an arbiter selection method and a period for arbiter selection updates. Arbiter selector 150 thereafter uses the arbiter selection method to select from among several arbiters 148 within arbiter unit 146, updating the selected arbiter at intervals defined by the received period for selection updates.

The process then proceeds to step 204, which illustrates arbiter selector 150 initializing a series of counters. A first counter, Ccnt 166, is initialized to equal the period for selection updates received in step 202. Ccnt 166 serves as a cycle counter. A second counter, Rcnt 162, a read counter, is set to zero. A third counter, Wcnt 164, which serves as a write counter, is also set to zero. The process then moves to step 206, which illustrates arbiter selector 150 conforming to the selection method received in step 202. If, in step 202, the indicated arbiter selection method was a hardware-only selection method, then the process next passes to step 208, which is the first step of a hardware-only approach to arbiter selection, represented by steps 208-214.

In the hardware-only approach represented by steps 208-214, there is no reliance on software to perform arbiter selection, and hardware attempts to determine and use memory command patterns for arbiter selection. When a new Read command arrives from system interconnect fabric 106, arbiter selector 150 increments Rcnt 162. Similarly, Wcnt 164 is incremented when a Write command is detected. Also, at every cycle of system interconnect fabric 106, Ccnt 166 is decremented. The incrementing procedure applies only to new commands, and retried commands are not counted, because it is helpful to capture the original memory command pattern generated by the program, and only new commands determine this pattern. Otherwise, because some commands may potentially be retried during program execution, command streams arriving at memory controller 152 would eventually diverge from the actual pattern.

In step 208, the hardware of arbiter unit 146 detects a next command, CMD, which is received from system interconnect fabric 106 at arbiter unit 146. The process then moves to step 210, which illustrates arbiter selector 150 updating the read counter, Rcnt 162 or the write counter, Wcnt 164, based upon the command type. The process then passes to step 212, which illustrates arbiter selector 150 decrementing command counter, Ccnt 166. The process then passes to step 214, which illustrates arbiter selector 150 determining if the value of command counter, Ccnt 166, equals zero. If the value of command counter, Ccnt 166, does not equal zero, then the process returns to step 208.

If, in step 214, arbiter selector 150 determines that the value of command counter, Ccnt 166, equals zero, then the process next moves to step 216, which depicts arbiter selector 150 calculating a read/write ratio, r, which is defined as the ratio of the value of the read counter, Rcnt 162, to the write counter, Wcnt 164. Assuming that there may be at most 2n+1 different ratios, Si, the preferred embodiment determines the appropriate ratio for the current Rcnt 162 and Wcnt 164 values in an n-stage computation. Each operation in every stage can be performed independently of each other. For simplicity, the following equations represent will represent Rcnt 162 with R and Wcnt 164 with W, and assume n is a power of 2. In the following equations, $S_{aRbW}$ represents the ratio for "a Reads per b Writes" command pattern.

Because the following computation is performed once every Ccnt cycles, its cost is negligible.

Stage 0: R and W values are already in counters.
 $S_{aRbW}=0$ where (a $\in$[1,n] & b $\in$[1,n]) or (a,b)=(0,1) or (a,b)=(1, 0)
Stage 1: $2^0R$=lshift(R,1), $2^0W$=lshift(W,1), $2^1R$=lshift(R,2), $2^1W$=lshift(W,2), ..., $2^{\log_2 n}R$=lshift(R,$\log_2 n$), $2^{\log_2 n}W$=lshift(W,$\log_2 n$)
Stage 2: if (W<2R & R<2W)    $S_{1W1R}=1$
 if (W>kR)    $S_{0R1W}=1$    (only writes)
 if (R>kW)    $S_{1R0W}=1$    (only reads)
 3R=2R+R, 3W=2W+W
...
Stage j: if (R$\geq$(j-1)W & R<jW)  $S_{(j-1)W1R}=1$
 if (W$\geq$(j-1)R & W<jR)  $S_{(j-1)R1W}=1$
 $iR=2^{j-1}R+tR$  where $1\leq t\leq 2^{j-2}-1$ and $2^{j-1}+1\leq i\leq 2^{j-1}+2^{j-2}-1$
 $iR=2^jR-tR$  where $1\leq t\leq 2^{j-2}$ and $2^j-2^{j-2}\leq i\leq 2^j-1$
where 3$\leq$j$\leq$n.

The process then proceeds to step 217, which illustrates the currently selected arbiter 148 making a state transition to the next appropriate state in response to the command, CMD, received from system interconnect fabric 106. The process then moves to step 218, which illustrates arbiter selector 150 selecting an arbiter from among arbiters 148 with the closest read/write ratio to the value of r calculated in step 216 and activating parameters for the new arbiter in arbiters 148 while also setting the new arbiter among arbiters 148 to the appropriate new state, which is also the new state configured in the current arbiter among arbiters 148.

The process next moves to step 222, which illustrates allowing software stored in system memory 104, such as operating system 108, compilers 115, or application program modules 111 to change the selection method to be used by arbiter selector 150 to select the next arbiter from among the arbiters 148. The process then moves to step 224, which illustrates arbiter selector conditionally resetting the read counter and the write counter to zero if the next arbiter type chosen in step 222 is a hardware-only selection method.

The process then proceeds to step 226, which illustrates arbiter selector resetting the Rcnt 162 and Wcnt 164 to zero if the arbiter selection type for selecting the next arbiter from arbiters 148 is the hybrid selection type and if hardware updates are enabled. The process then proceeds to step 228, which illustrates resetting Ccnt 166. The process then returns to step 206. Values of Rcnt and Wcnt are reset to zero when Ccnt becomes zero to detect new phases in a program executing on processing units 102. Failure to reset the counters to zero would result in a condition wherein previous commands will continue to dominate the Rcnt-Wcnt ratio, leading to incorrect arbiter selections. For example, Rcnt and Wcnt can be both 100 after a program section where the number of Reads and Writes are equal, but the ratio of the counters will not change quickly enough when program enters another phase, e.g. where there are two Reads per Write.

An advantage of the hardware-only approach to arbiter selection is its ability to handle cases where a memory controller 152 serves more than one processor within processing unit 102. Regardless of the source of the commands, memory controller 152 will attempt to capture the command pattern as well as possible.

If in step 206, it is detected that a software-only arbiter selection method was received as the desired selection method for selector 150 in step 202, then the process moves to step 230, which is the first step of a software-only approach, represented by steps 230-234. In this software-only approach, operating system 108, compilers 115 or application program modules 111 drive the arbiter-selection process. Because Rcnt 162 and Wcnt 164 are user-accessible and application-accessible, application program modules 111 and compilers 115 can overwrite these counters using pragma directives in the code, or other similar keywords in code that deliver instructions to a compiler, or a compiler 115 can generate appropriate values for the counters by statically analyzing the code. If an application 111 does not specify and incoming command pattern and a compiler cannot decide statically, run-time update of the counters can be performed.

Step 230 depicts software modifying the values of read counter, Rcnt 162 the write counter, Wcnt 164 and the command counter, Ccnt 166 at any cycle. In summary, operating system 108 application program modules 111 and compilers 115 decide the Read/Write pattern expected from a given point in the code and perform the following operations in the following order: 1) disable hardware updates to Rcnt 162 and Wcnt 164 and 2) write appropriate values into Rcnt 162 and Wcnt 164.

Subsequently, unless an Enable command is present in the code, hardware cannot change Rcnt 162 and Wcnt 164. If there is no Enable command in the entire code, then Rcnt 162 and Wcnt 164 values will persist until the next, if any, Disable-Write command pair appears in the code. As an example, for a "one Read per Write" pattern, both counters must have the same positive value, or similarly for "two Reads per Write" pattern, Rcnt 162 must have a value which is twice that of Wcnt 164. In other words, for "x Reads per y Writes" pattern, the Rcnt 162 value is be x, and Wcnt 164 value is y.

In systems in which multiple processing units 102 drive a single memory controller 152, counter update operations do not need to be automatically performed. If there is no conflict in attempted updates among processing units 102, a final result will be the same without regard to the order of the updates. If there is a conflict, then asserting priority between processing units 102 will not represent an optimal configuration for the entire system. For systems of this sort, hardware-only or hybrid approaches may provide better results.

The process then moves to step 232, which illustrates decrementing the command counter, Ccnt 166. The process next passes to step 234, which depicts arbiter selector determining whether the value of command counter, Ccnt 166, equals zero. If the value of command counter, Ccnt 166, equals zero, then the process returns to step 216. If the value of command counter, Ccnt 166, does not equal zero, then the process returns to step 230.

Returning to step 206, if a hybrid selection method was received in step 202 for arbiter selector 150, then the process moves to step 236, which begins a hybrid process, represented by steps 236-246. This technique is a combination of software-only and hardware-only approaches. Here, the hardware solution described above with respect to steps 208-214 is the default method, but software can interrupt and take control, and may later relinquish control back to hardware. Therefore, decision-making for the most appropriate memory controller can alternate between the hardware and software mechanisms.

The advantage of this composite approach lies in the flexibility to accommodate operating scenarios in which operating system 108, compilers 115 or application program modules 111 are aware of the sequence of expected commands and can therefore take control. Whenever compilers 115 or application program modules 111 are not aware of the sequence of expected commands, compilers 115 or application program modules 111 can return control to hardware.

The utility of the software-only approach is limited by the ability of operating system 108, compilers 115 or application program modules 111 to predict the command sequence, the success of which prediction is not always reliable. In the hardware-only approach, on the other hand, access by other processing units 102 to the same memory controller 152 may cause failure of the command-behavior detection mechanism. The hybrid mechanism has the full advantage of hardware-only approach, but allows software control for the cases where one processing unit 102 must assure that detection of its command behavior is not affected by other processing units 102. Additionally, the hardware-only approach has to wait until the Ccnt 166 counter becomes zero before changing a behavior decision, but the hybrid approach can change arbiters 148 as soon as a new phase in a program is detected.

The preferred embodiment uses the following protocol for software for obtaining control from hardware: 1) disable hardware and other processor software updates to Rcnt 162 and Wcnt 164, 2) reset Ccnt 166 to a predetermined value, 3) write appropriate values into Rcnt 162 and Wcnt 164, and 4) write an appropriate value into Ccnt 166 (optional). Until an Enable command is seen in the code, hardware cannot change Rcnt 162 and Wcnt 164, but Ccnt 166 will be decremented at every cycle. If there is no Enable command in the entire code, then the hybrid approach will implement a software-only approach from that point on. If operating system 108, compilers 115 or application program modules 111 ascertains that a certain pattern will last more or fewer than the predetermined number of cycles in Ccnt 166, operating system 108, compilers 115 or application program modules 111 can overwrite that counter as well.

Step 236 illustrates arbiter selector 150 enabling or disabling hardware updates to counters at various cycles in response to instructions stored in system memory 104. The process then proceeds to step 238, which illustrates software modifying the read counter, Rcnt 162, the write counter, Wcnt 164 and the command counter, Ccnt 166, at any cycle in response to the disabling of hardware updates to the read counter, Rcnt 162, the write counter, Wcnt 164 and the command counter, Ccnt 166. The process then moves to step 240, which illustrates arbiter selector 150, detecting a next command CMD arriving at arbiter unit 146 from system interconnect fabric 106, if hardware updates to counters are enabled.

The process then proceeds to step 242, which illustrates, if hardware updates are enabled, arbiter unit 146 updating read counter, Rcnt 162, write counter, Wcnt 164 and command counter, Ccnt 166 in response to a command received from system interconnect fabric 106. If the command is a read command, arbiter unit 146 increments the read counter, Rcnt 162 and if the command is a write command, then arbiter unit 146 incremented write counter, Wcnt 164. The process next moves to step 244, which illustrates arbiter unit 146 decrementing command counter, Ccnt 166, by one. The process then proceeds to step 246, which depicts arbiter selector 150 determining whether the value of command counter, Ccnt 166, equals zero. If the value of command counter, Ccnt 166, equals zero, then the process returns to step 216. If the value of command counter, Ccnt 166, does not equal zero, then the process returns to step 236.

The preferred embodiment also includes arbiter generator 107 for generating an arbiter design in a data processing system. In the preferred embodiment, arbiters 148 track the most recent of commands sent to memory, which are stored in command history data structure 110, and select the next command using optimization criteria. Arbiter generator 107 relies on two main criteria for selecting the next command for transmitting to memory: (1) aggregate total delay and (2) the amount of deviation from an expected command pattern. Therefore, the preferred embodiment will create an arbiter design that minimizes total delay and at the same time keeps the ideal command pattern of the arbiter as close as possible to the command sequence delivered to memory. However, these two optimization constraints can conflict. For instance, it is possible that a command that minimizes total delay is not the best choice to approximate the received command pattern, or vice versa. There is no definite answer for which one, if any, of the two criteria should have priority over the other.

Arbiters 148 track the last n commands sent to memory, storing the last n commands sent to memory within command history data structure 110 as a Pcmds[1..n] array 170, which represents the last n commands sent to memory. Pcmds[1] holds the oldest command and Pcmds[n] holds the most recent command. When a new command, cnew, is sent to memory 152, this array is shifted one element, i.e. Pcmds[i]=Pcmds[i+1] where $1 \leq i < n$, and the new element is inserted into Pcmds[n]. Each element of Pcmds can hold m different types of commands, where m is memory system dependent. For example, if there are two ports in the system and port number is the only feature considered, then m equals 4 because the possible commands are limited to Read_Port0, Read_Port1, Write_Port0, and Write_Port1.

Therefore, the preferred embodiment includes a general algorithm in which each optimization criterion has variable weight determined probabilistically. The Current state in the state machine is represented by an integer and calculated with the following function:

```
calculate_state_number(m, n, Pcmds)
Pstate=0
    for i=1 to n
        Pstate=Pstate+Pcmds[i]*m^(n-i)
    endfor
    return Pstate
endfunction
```

In the function above, elements in Pcmds[1..n] array 170 have the value of v for command type v, where 0≦v<m. For convenience, commands 0, m/2 are Reads and commands m/2, m are Writes. The arbiter generator 107 considers every possible element in Pcmds[1..n] array 170, i.e. mn states, and every possible command type. Arbiter generator 107 then determines the next state on the stated conditions and optimization constraints. Note that, in the final algorithm output, there will be total of mn+m+1 states. Here, (m+1) is the number of states where some elements in Pcmds[1..n] array 170 are empty.

In systems including more than one optimization constraint, arbiter generator 107 determines priority among the constraints probabilistically. Before any state transition, a random number, Pchoice, is generated, for example, by using some bits of addresses, and this number is used to determine the rules for state transitions as follows:

```
Pchoice=a random number between 0 and threshold_k (there are k
optimization orders)
state x: if (Pchoice < threshold_1)
      next state is determined with the optimization order (a, b, c)
   else if (Pchoice < threshold_2)
      next state is determined with the optimization order (a, c, b)
   else if (Pchoice < threshold_3)
      next state is determined with the optimization order (b, a, c)
   ...
   endif
state y: if (Pchoice < threshold_1)
      next state is determined giving with the optimization order (a, b,
c)
   ...
```

In this approach, threshold values are system-dependent and should be determined experimentally. Note that arbiter generator 107 can force the state machine to always use the same optimization order by normalizing Pchoice value to be in the [threshold_t, threshold_(t+1)] interval or by modifying threshold values. Arbiter generator 107 uses two optimization criteria, which are total delay and deviation from the pattern, and need only one threshold value. As an example, if the optimization order (total_delay, deviation_from_pattern) is used eighty percent of the time, arbiter generator 107 will use a three-bit random number generator and a threshold value of six. If the random number is smaller than six, then the preferred order will be selected eight out of ten times.

The arbiter generator 107 also uses the info[1..m] array 172, wherein each element 178 has two fields, Tdelay 174 and Ctype 176. Both of these fields are populated with integers, and Tdelay 174 has the total delay if a command of type Ctype 176 is sent to memory as the next command. Arbiter generator 107 also contains a doublesort(info, a1, a2, a3) function 180 where elements of info[1..m] array 172 are sorted using first the al field and next the a2 field by a3{<,>}, the comparison function 182. Comparison function 182 determines whether sorted elements are sorted in ascending or descending order. The sorted_info_delay array 184 stores elements of the info[1..m] array 172, sorted by total delay first and deviation from the pattern next. Similarly, a sorted_info_pattern array 186 stores elements from info[1..m] array 172, sorted first by pattern information and then by total delay.

Figure 3:
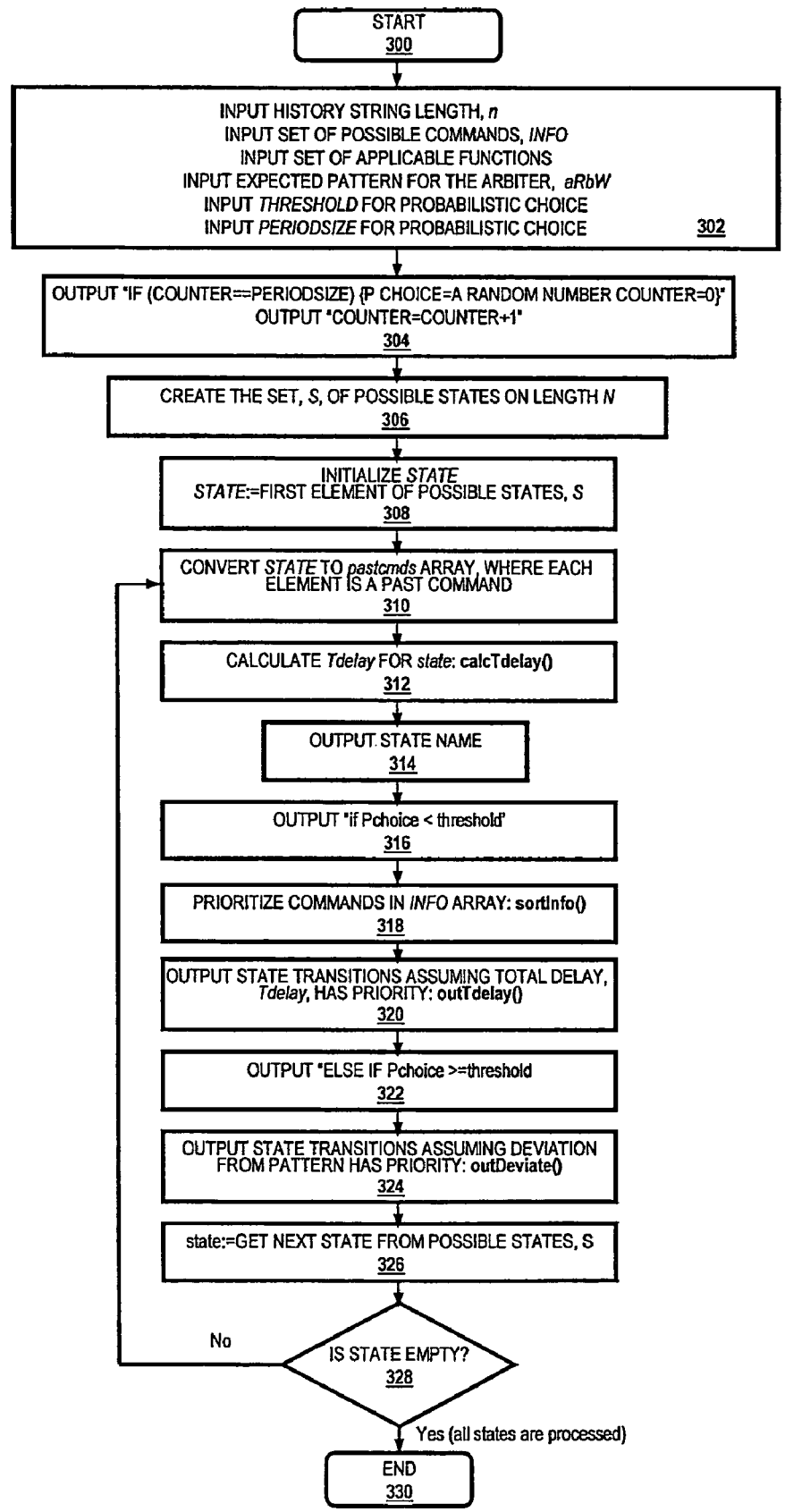
FIG. 3 is a high-level logical flowchart of a process for generating an arbiter design in a data processing system in accordance with a preferred embodiment of the present invention.

Turning now to FIG. 3, a high-level logical flowchart of a process for generating an arbiter design in a data processing system in accordance with the preferred embodiment of the present invention is illustrated. The process starts at step 300, which illustrates activation of an arbiter generator 106 and system memory 104. The process then proceeds to step 302, which illustrates arbiter generator 107 receiving a series of inputs. Inputs include a history string length, n, a set of possible commands from info[1..m] array 172, a set of applicable of functions, an expected pattern, of the form aRbW, for commands received to the arbiter, a threshold value for probabilistic choice, Pchoice, and periodsize value for probabilistic choice. The process then proceeds to step 304, which depicts a performing an output operation, wherein if the value of a counter 185 equals the periodsize received in step 302, then the variable pchoice is set to equal a random number, and the value of counter 185 is set equal to zero. The counter 185 is then incremented. The process next moves to step 306, which depicts creating a set s of possible arbiter states of length n. The process next moves to step 308, which illustrates initializing the state variable and defining it to equal the first element of the set of possible states s. The process then moves to step 310, which illustrates populating the state variable of step 308 with a past commands array, wherein each element is a past command.

The process next proceeds to step 312, which illustrates arbiter generator 107 calculating the total delay for the current value of the state variable, as illustrated and described below with respect to FIG. 4. The process then moves to step 314, which depicts performing the output of the current state name from the list of possible states. The process then moves to step 316, which depicts performing an output of variable Pchoice if Pchoice has a value less then the threshold variable. The process then proceeds to step 318, which depicts prioritization of commands in the info [1..m] array 172, as is explained in detail below with respect to FIG. 5A.

The process then moves to step 320, which illustrates arbiter generator 107 performing an output of state transitions assuming a total delay has priority, as is explained in detail below with respect to FIG. 5B. The process next moves to step 322, which illustrates performing an output of the variable Pchoice if it has a value greater than or equal to the value of the threshold variable. The process then moves to step 324, which depicts performing an output of state transitions assuming deviation from the pattern received in step 302 has priority, as is explained below with respect to FIG. 5C.

Next, at step 326, arbiter generator 107 defines the state variable as the next state from the set of possible states s. The process then moves to step 328, which depicts determining whether the state variable is empty. If the state variable is empty, then the process ends at step 330. If the state variable is not empty, then the process returns to step 310, which has been described above.

The process represented by FIG. 3 can be expressed in pseudo-code as follows:

```
process: probabilistic_arbiter_design
   for Pcmds all combinations of command sequences of size n
Step 1: for each possible next command calculate total delay
      for cnew all command types
         for i=1 to n; j=1 to number of cost functions; f_j(Pcmds[i],cnew)is
applicable
               fcost_i(cnew)=max(f_j(Pcmds[i],cnew))-(i-1)
         endfor
         info[cnew].Tdelay=max(fcost_{1..n}(cnew))
         info[cnew].Ctype=Pcmds[i]
      endfor
```

```
Step 2: sort possible commands with respect to total delay and
        deviation from the pattern. if current read/write ratio
        is smaller than the ratio of the arbiter read operations
        have higher priority, otherwise writes have priority.
    read_write_ratio_Pcmds=(# of reads in Pcmds)/(# of writes
    in Pcmds)
    if (read_write_ratio_Pcmds < read_write_ratio_arbiter)
// need more reads
        sorted_info_delay=doublesort(info,Tdelay,Ctype,<)
        sorted_info_pattern=doublesort(info,Ctype,Tdelay,<)
    else
        sorted_info_delay=doublesort(info,Tdelay,Ctype,>)
// need more writes
        sorted_info_pattern=doublesort(info,Ctype,Tdelay,>)
    endif
Step 3: for each possible next command, output next states in the state
machine
        for the current state. with the probability Pchoice, total delay
        will be first decision factor in optimization and with probability
        1-Pchoice deviation from the pattern is the first decision factor.
    current_state=calculate_state_number(m,n,Pcmds)
    d_Pcmds=1shift(Pcmds)
    output(if Pchoice < treshold)
    for i=1 to m
        cnew=sorted_info_delay[i].Ctype
        d_Pcmds[n]=cnew
        next_state=calculate_state_number(m,n,d_Pcmds)
        output(current_state, cnew, next_state)
    endfor
    output(if Pchoice >= treshold)
    for i=1 to m
        cnew=sorted_info_pattern[i].Ctype
        d_Pcmds[n]=cnew
        next_state=calculate_state_number(m,n,d_Pcmds)
        output(current_state, cnew, next_state)
    endfor
    endfor // big loop
endprocess
```

An example of the arbiter generation process input values and results is provided below as a demonstration of the function described above. For purposes of example, assume that there are two read and two write ports in the system and outputs for n=1 and n=2. Since there are two ports, in both examples there are four kinds of memory commands, namely Read_Port0 (R0), Read_Port1 (R1), Write_Port0 (W0), and Write_Port1 (W1). For the cost functions, assume the following:

f1: Read after Read, same port=2 f2: Read after Read, different port=3 f3: Read after Write, same port=6 f4: Read after Write, different port=4 f5: Write after Read, same port=3 f6: Write after Read, different port=5 f7: Write after Write, same port=2 f8: Write after Write, different port=4

The results of the arbiter generation process, for input listed above, follow below. Results of the arbiter generation process for an arbiter with 2R1W pattern, i.e., two Reads for one Write are, for clarity, presented below in a format similar to a C program.

EXAMPLE 1 n=1, m=4

Pchoice=a random number between 0 and k threshold

```
switch(s) {                                 // s is the current
state
case 0: // initial state, there was no commands before
        if (Pchoice < threshold) {          // total delay has
priority
            if (R0)      s=1;
            else if (R1) s=2;
                else if (W0) s=3;
                    else if (W1) s=4;
        else {                              // pattern similarity has
priority
            if (R0)      s=1;
            else if (R1) s=2;
                else if (W0) s=3;
                    else if (W1) s=4;       // if W1 is
            selected, next state is 4
        }
        break;
case 1: // previous command was R0
        if (Pchoice < threshold) {
            if (R0)      s=1;
            else if (R1) s=2;
                else if (W0) s=3;
                    else if (W1) s=4;
        else {
            if (W0)      s=3;
            else if (W1) s=4;
                else if (R0) s=1;
                    else if (R1) s=2;
        }
        break;
case 2: // previous command was R1
        if (Pchoice < threshold) {
            if (R1)      s=2;
            else if (R0) s=1;
                else if (W1) s=4;
                    else if (W0) s=3;
        else {
            if (W1)      s=4;
            else if (W0) s=3;
                else if (R1) s=2;
                    else if (R0) s=1;
        }
        break;
case 3: // previous command was W0
        if (Pchoice < threshold) {
            if (W0)      s=3;
            else if (R1) s=2;
                else if (W1) s=4;
                    else if (R0) s=1;
        else {
            if (R1)      s=2;
            else if (R0) s=1;
                else if (W0) s=3;
                    else if (W1) s=4;
        }
        break;
case 4: // previous command was W1
        if (Pchoice < threshold) {
            if (W1)      s=4;
            else if (R0) s=1;
                else if (W0) s=3;
                    else if (R1) s=2;
        else {
            if (R0)      s=1;
            else if (R1) s=2;
                else if (W1) s=4;
                    else if (W0) s=3;
        }
        break;
} // switch
```

EXAMPLE 2 n=2, m=4

```
Pch=a random number between 0 and k thr
switch(s) { // s is the current state
  case 0:  // --, initial state, there was no commands before
    if (Pch<thr){if (R0) s=1; else if (R1) s=2; else if (W0) s=3; else if
(W1) s=4;}
    else {if (R0) s=1; else if (R1) s=2; else if (W0) s=3; else if (W1)
s=4;}
    break;
  case 1:  // -R0
    if (Pch<thr){if (R0) s=5; else if (R1) s=6; else if (W0) s=7; else if
(W1) s=8;}
    else {if (W0) s=7; else if (W1) s=8; else if (R0) s=5; else if (R1)
s=6;}
    break;
  case 2:  // -R1
    if (Pch<thr){if (R1) s=10; else if (R0) s=9; else if (W1) s=12; else
if (W0) s=11;}
    else {if (W1) s=12; else if (W0) s=11; else if (R1) s=10; else if
(R0) s=9;}
    break;
  case 3:  // -W0
    if (Pch<thr){if (W0) s=15; else if (R1) s=14; else if (W1) s=16;
else if (R0) s=13;}
    else {if (R1) s=14; else if (R0) s=13; else if (W0) s=15; else if
(W1) s=16;}
    break;
  case 4:  // -W1
    if (Pch<thr){if (W1) s=20; else if (R0) s=17; else if (W0) s=19;
else if (R1) s=18;}
    else {if (R0) s=17; else if (R1) s=18; else if (W1) s=20; else if
(W0) s=19;}
    break;
  case 5:  // R0R0
    if (Pch<thr){if (R0) s=5; else if (R1) s=6; else if (W0) s=7; else if
(W1) s=8;}
    else {if (W0) s=7; else if (W1) s=8; else if (R0) s=5; else if (R1)
s=6;}
    break;
  case 6:  // R0R1
    if (Pch<thr){if (R1) s=10; else if (R0) s=9; else if (W1) s=12; else
if (W0) s=11;}
    else {if (W1) s=12; else if (W0) s=11; else if (R1) s=10; else if
(R0) s=9;}
    break;
  case 7:  // R0W0
    if (Pch<thr){if (W0) s=15; else if (R1) s=14; else if (W1) s=16;
else if (R0) s=13;}
    else {if (R1) s=14; else if (R0) s=13; else if (W0) s=15; else if
(W1) s=16;}
    break;
  case 8:  // R0W1
    if (Pch<thr){if (R1) s=18; else if (W0) s=19; else if (W1) s=20;
else if (R0) s=17;}
    else {if (R0) s=17; else if (R1) s=18; else if (W0) s=19; else if
(W1) s=20;}
    break;
  case 9:  // R1R0
    if (Pch<thr){if (R0) s=5; else if (R1) s=6; else if (W0) s=7; else if
(W1) s=8;}
    else {if (W0) s=7; else if (W1) s=8; else if (R0) s=5; else if (R1)
s=6;}
    break;
  case 10: // R1R1
    if (Pch<thr){if (R1) s=10; else if (R0) s=9; else if (W1) s=12; else
if (W0) s=11;}
    else {if (W1) s=12; else if (W0) s=11; else if (R1) s=10; else if
(R0) s=9;}
    break;
  case 11: // R1W0
    if (Pch<thr){if (R1) s=14; else if (W0) s=15; else if (W1) s=16;
else if (R0) s=13;}
    else {if (R1) s=14; else if (R0) s=13; else if (W0) s=15; else if
(W1) s=16;}
    break;
  case 12: // R1W1
    if (Pch<thr){if (W1) s=20; else if (R0) s=17; else if (W0) s=19;
else if (R1) s=18;}
    else {if (R0) s=17; else if (R1) s=18; else if (W1) s=20; else if
(W0) s=19;}
    break;
  case 13: // W0R0
    if (Pch<thr){if (R1) s=6; else if (W0) s=7; else if (R0) s=5; else if
(W1) s=8;}
    else {if (R1) s=6; else if (R0) s=5; else if (W0) s=7; else if (W1)
s=8;}
    break;
  case 14: // W0R1
    if (Pch<thr){if (R1) s=10; else if (W1) s=12; else if (R0) s=9; else
if (W0) s=11;}
    else {if (R1) s=10; else if (R0) s=9; else if (W1) s=12; else if (W0)
s=11;}
    break;
  case 15: // W0W0
    if (Pch<thr){if (W0) s=15; else if (R1) s=14; else if (W1) s=16;
else if (R0) s=13;}
    else {if (R1) s=14; else if (R0) s=13; else if (W0) s=15; else if
(W1) s=16;}
    break;
  case 16: // W0W1
    if (Pch<thr){if (W1) s=20; else if (W0) s=19; else if (R0) s=17;
else if (R1) s=18;}
    else {if (R0) s=17; else if (R1) s=18; else if (W1) s=20; else if
(W0) s=19;}
    break;
  case 17: // W1R0
    if (Pch<thr){if (R0) s=5; else if (W0) s=7; else if (R1) s=6; else if
(W1) s=8;}
    else {if (R0) s=5; else if (R1) s=6; else if (W0) s=7; else if (W1)
s=8;}
    break;
  case 18: // W1R1
    if (Pch<thr){if (R0) s=9; else if (W1) s=12; else if (R1) s=10; else
if (W0) s=11;}
    else {if (R0) s=9; else if (R1) s=10; else if (W1) s=12; else if (W0)
s=11;}
    break;
  case 19: // W1W0
    if (Pch<thr){if (W0) s=15; else if (W1) s=16; else if (R1) s=14;
else if (R0) s=13;}
    else {if (R1) s=14; else if (R0) s=13; else if (W0) s=15; else if
(W1) s=16;}
    break;
  case 20: // W1W1
    if (Pch<thr){if (W1) s=20; else if (R0) s=17; else if (W0) s=19;
else if (R1) s=18;}
    else {if (R0) s=17; else if (R1) s=18; else if (W1) s=20; else if
(W0) s=19;}
    break;
} // switch
```

Figure 4:
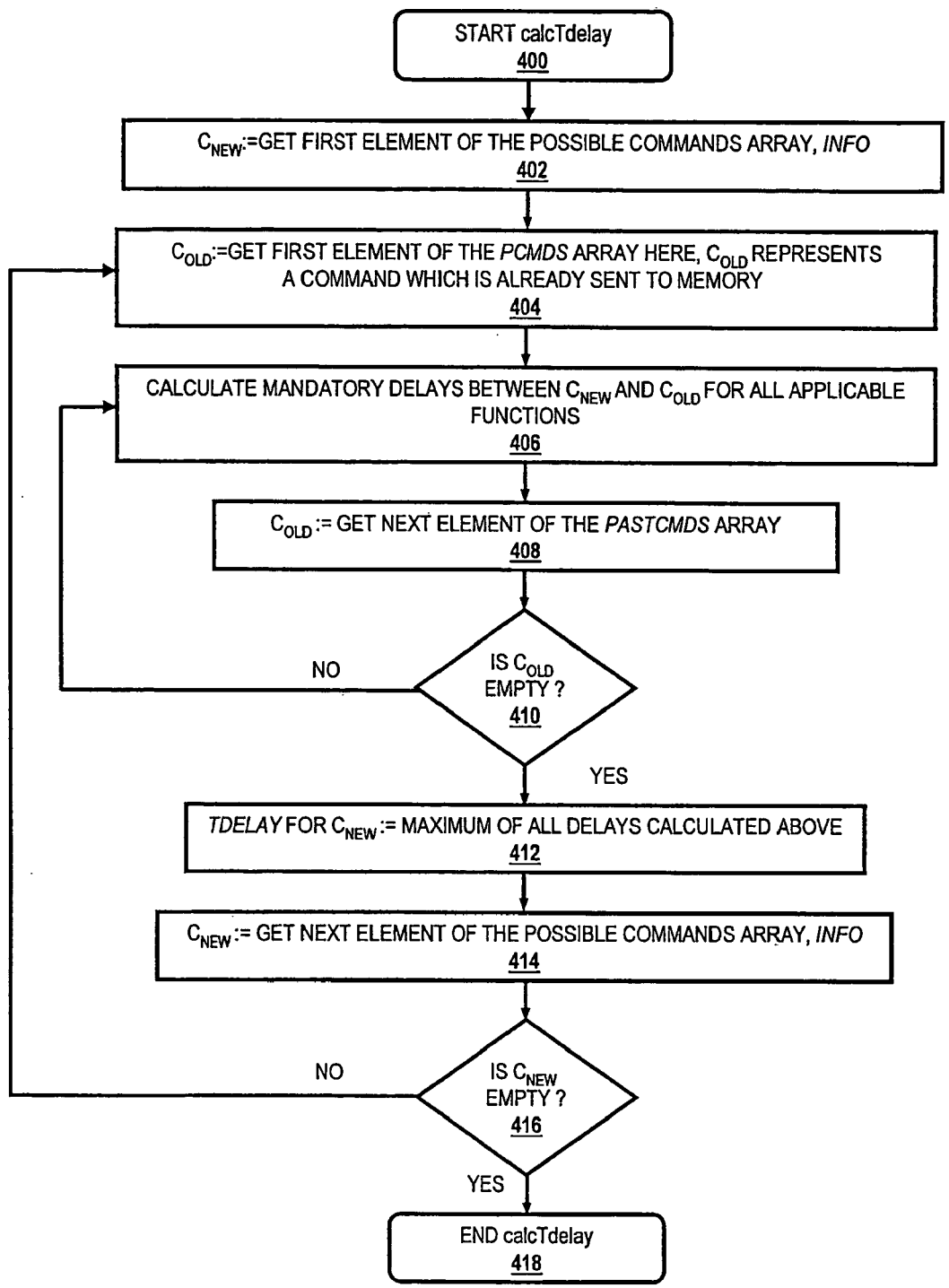
FIG. 4 is a high-level logical flowchart of a process for calculating delay in the course generating an arbiter design in a data processing system in accordance with a preferred embodiment of the present invention.

With reference now to FIG. 4, a high-level logical flowchart of a process for calculating delay in the course of generating an arbiter design in a data processing system in accordance with the preferred embodiment of the present invention is depicted. Delay is calculated by considering the constraints between cnew and the previous n commands which were already sent to memory, basing the calculation upon previous n commands $c1, c2, \ldots, cn$, where $c1$ is the last command sent, $c2$ is the immediately preceding command, and so on, cn being the oldest command. The preferred embodiment uses k cost functions, $f_{1..k}(cx,cy)$, to represent the mandatory delays between any two memory commands, cx and cy. Here, both k and the cost functions are memory system dependent. Examples of possible such functions include delay necessary because both commands access to: 1) the same bank/rank in memory where cx is a Read and cy is a Read, 2) the same bank/rank in memory where cx is a Read and cy is a Write, 3) the same bank/rank in memory where cx is a Write and cy is a Read, 4) the same bank/rank in memory where cx is a Write and cy is a Write, 5) different bank/rank in memory where cx is a Read and cy is a Read, 6) different bank/rank in memory where cx is a Read and cy is a Write, 7) different bank/rank in memory where cx is a Write and cy is a Read and 8) different bank/rank in memory where cx is a Write and cy is a Write.

Similarly, cost functions may exist because of same/different port accesses. Assuming that an arbiter 148 according to the preferred embodiment has no way of knowing how many cycles before commands c1, c2, . . . , cn were sent, arbiter generator 107 assumes that commands were all sent one cycle apart from each other. In the next step, arbiter generator 107 calculates the delays imposed by each cx, $x \in [1,n]$ on cnew for each $f_{i..k}$ function, which is applicable to any (cx,cnew) pair. The term "applicable function" means that particular function's condition is satisfied. Defining n final cost functions, $fcost_{i..n}$, $fcost_i(cnew) = max(f_j(ci, cnew)) - (i-1)$, where $i \in [1,n]$, $j \in [1,k]$, and $f_j(ci,cnew)$ is applicable. Arbiter generator 107 takes the maximum of $f_j$ function values because any previous command, ci, and cnew may be related by more than one $f_j$ function. In this formula, subtracted term (i−1) represents the number of cycles ci had been sent before cnew. Thus, total delay that will be introduced by sending cnew is $Tdelay(cnew) = max(fcost_{1..n}(cnew))$.

The process starts at step 400, which depicts initiation of a routine for calculating total delay. The process then proceeds to step 402, which illustrates defining a variable cnew as the first element of info[1..m] array 172. The process then moves to step 404, which depicts setting a variable cnew equal to the first element of the past commands array, where cold represents a command which is already sent to memory. The process next proceeds to step 406, which illustrates calculating all mandatory delays between cnew and cold for all applicable functions. The process next proceeds to step 408, which illustrates setting cold to the next element of the past commands array.

The process then moves to step 410, which depicts arbiter generator 107 determining whether the cold array is empty. If the cold array is not empty, then the process returns to step 406. If cold is empty, then the process proceeds to step 412. At step 412, arbiter generator 107 defines the value of Tdelay for cnew to equal the maximum of all delays calculated prior to step 412. The process then moves to step 414, which depicts arbiter generator 107 defining cnew to equal the next element of info[1..m] array 172. The process next proceeds to step 416, at which step depicts arbiter generator 107 determines whether the cnew array is empty. If the cnew array is not empty, then the process returns to step 404. If the cnew array is empty, then the process proceeds ends at step 418.

Figure 5A:
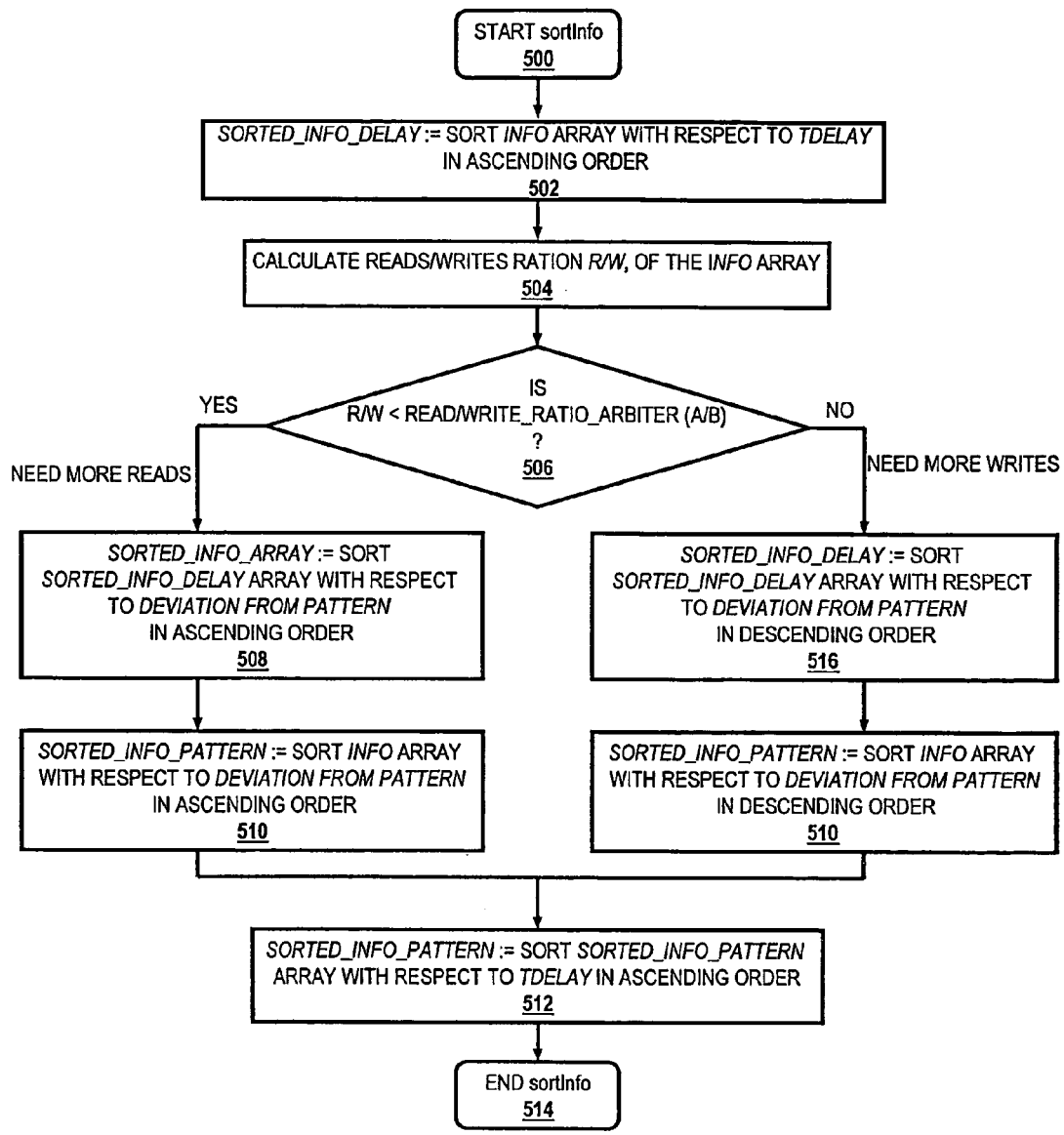
FIG. 5A is a high-level logical flowchart of a process for prioritizing commands with respect to delay and deviation from an expected command pattern in the course of generating an arbiter design in a data processing system in accordance with a preferred embodiment of the present invention.

Turning now to FIG. 5A, a high-level logical flowchart of a process for prioritizing commands with respect to delay and deviation from an expected command pattern in the course of generating an arbiter design in a data processing system in accordance with the preferred embodiment of the present invention is depicted. The process begins at step 500, which depicts activation of a routine for performing a sort. The process then moves to step 502, which depicts defining a variable sorted_info_delay array 184 as a result of a sort of info[1..m] array 172 with respect to Tdelay in ascending order. The prioritization contained within sorted_info_delay array 184 represents a tentative arbiter design. The process then proceeds to step 504, which depicts arbiter generator 107 calculating the read-to-write ratio of the info[1..m] array 172. The process then moves to step 506, which depicts determining whether the read/write ratio calculated in step 504 is less than or equal to the read/write ratio of tentative arbiter design represented by sorted_info_delay array 184. If the read/write ratio calculated in step 504 is less than the read/write ratio of the given arbiter, then the process moves to step 508, which depicts redefining the sorted_info_delay array 184 variable by sorting the sorted_info_delay array 184 with respect to deviation from an expected read/write pattern in ascending order. The process then proceeds to step 510, which depicts defining a variable sorted_info_pattern array 186, which includes sorting the info[1..m] array 172 with respect to deviation from an expected read/write pattern in ascending order. The process then moves to step 512, which depicts defining the variable sorted_info_pattern array 186 by sorting the sorted_info_pattern array 186 with respect to Tdelay in ascending order. The process then ends at step 514.

Turning to step 506, if in step 506, arbiter generator 106 determines that the ratio of reads to writes calculated in step 504 is not less than or equal to the read-to-write ratio of the specific arbiter, then the process proceeds to step 516, which depicts defining a variable sorted info delay array 184 by sorting the sorted_info_delay array 184 with respect to deviation from the expected pattern in descending order. The process then moves to step 518, which depicts defining the variable sorted_info_pattern array 186 by sorting the info [1..m] array 172 with respect to deviation from an expected pattern in descending order. The process next proceeds to step 512, as discussed above.

Figure 5B:
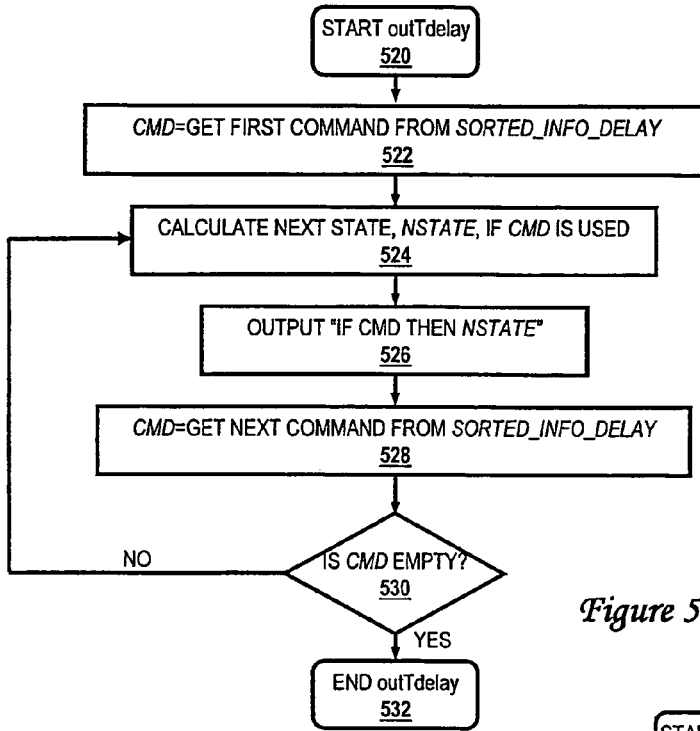
FIG. 5B is a high-level logical flowchart of a process for output of state transitions on the assumption of priority with respect to delay in the course of generating an arbiter design in a data processing system in accordance with a preferred embodiment of the present invention.

With reference now to FIG. 5B, a high-level logical flowchart of a process for providing output of state transitions on the assumption of priority with respect to delay in the course of generating an arbiter design in a data processing system in accordance with the preferred embodiment of the present invention is depicted. The process begins at step 520, which depicts activation of a routine to output state transitions for one state assuming the variable Tdelay has priority. The process next moves to step 522, which depicts receipt of a first command from a sorted_info_delay array 184. The process then moves to step 524, which depicts calculating a next state necessary in an arbiter if a particular command is used. The process next proceeds to step 526, which depicts creating an output of the form "if command then n state", where n state is the next state calculated in step 524. The process then proceeds to step 528, which depicts receiving a next command from the sorted_info_delay array 184. The process then moves to step 530, which depicts determining whether sorted_info_delay array 184 is empty. If sorted_info_delay array 184 is not empty, then the process returns to step 524. If sorted_info_delay array 184 is empty, then the process ends at step 532.

Figure 5C:
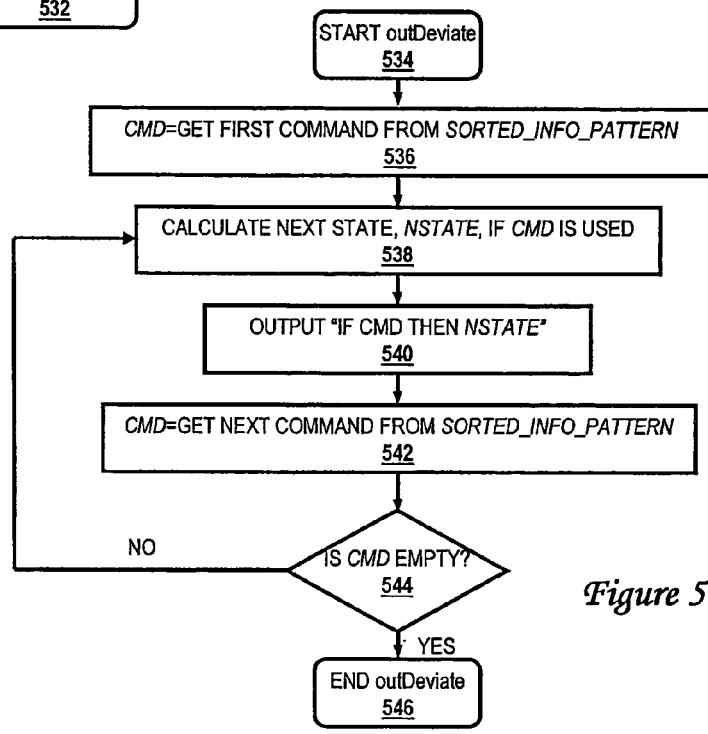
FIG. 5C is a high-level logical flowchart of a process for output of state transitions on the assumption of priority with respect to deviation from pattern in the course of generating an arbiter design in a data processing system in accordance with a preferred embodiment of the present invention.

Turning now to FIG. 5C, a high-level logical flowchart is depicted for a process for output of state transitions in an arbiter design on the assumption of priority with respect to deviation from pattern in the course of generating an arbiter design in a data processing system in accordance with the preferred embodiment of the present invention. The process begins at step 534, which depicts activation of a module for output of state transitions for one state assuming deviation from pattern has priority. The process then moves to step 536, which depicts defining a command variable as the first command from the array sorted_info_pattern array 186. The process then moves to step 538, which depicts calculating a next state, n, if the command defined in step 536 is used. The process then proceeds to step 540, which depicts performing an output of the statement of the form "if command, then n state". The process then next proceeds to step 542, which depicts defining the command variable CMD as the next command from the sorted_info_pattern array 186. The process then moves to step 544, which depicts determining if the CMD variable reference in step 542 is empty. If in step 544, the CMD variable is not empty, then the process returns to step 538. If the CMD variable is empty in step 544, the process ends at step 546.

The use of arbiter generator 107 improves both transmission of commands to memory in an order similar to that in which they are generated by the processors, and maximization of command and data bus utilization by determining appropriate design parameters and by minimizing delays between memory commands. Arbiter generator 107 provides an adaptive, dynamically-changing arbiter structure as an alternative to current single static arbiter designs. The preferred embodiment includes multiple arbiters, one of which is selected dynamically. Three different methods for selecting the most appropriate arbiter are provided: software-based, hardware-based, and hybrid. In the preferred embodiment, each of these methods first determines a memory command pattern statically and/or dynamically. Each method then uses this pattern to select an appropriate arbiter. This approach prevents unbalanced processing of commands, resulting in smoother system performance. The preferred embodiment also includes means to implement a design process for arbiters. This design process will minimize the overall delays between consecutive memory commands.

While in invention has been particularly shown as described with reference to a preferred embodiment, it will be understood by those skilled in the art that various changes in form and detail may be made therein without departing from the spirit and scope of the invention. Particularly, though the preferred embodiment is described with respect to an arbiter residing in a memory controller, the invention applies equally to arbiters in a variety of contexts, such as drive interfaces and command buses. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method of dynamically selecting an arbiter in a data processing system, said method comprising:
    selecting a first arbiter for current use in arbitrating between requestors for a resource;
    during operation of said data processing system, detecting requests by said requestors for said resource, wherein said detecting further comprises:
        detecting a plurality of diverse commands represented by said requests without regard to one or more sources of said requests,
        tracking requests for said resource containing a write command with a write counter, and
        tracking requests for said resource containing a read command with a read counter; and
    during operation of said data processing system, selecting a second arbiter in response to said detected plurality of diverse commands, wherein said selecting further includes:
        determining values of said write counter and said read counter;
        tracking requests for said resource with a command counter;
        receiving an instruction to select said second arbiter and a boundary value for said command counter;
        calculating a ratio of said value of said read counter to a value of said write counter;
        in response to reaching said boundary value, selecting a second arbiter with an ideal value of a read/write ratio approximating said ratio; and
        in response to said first arbiter making a transition to a new state, implementing said second arbiter.

2. The method of claim 1, said method further comprising enabling software to alter said read counter, said write counter, and said command counter.

3. The method of claim 2, wherein said step of enabling said software to alter said read counter, said write counter, and said command counter further comprises a compiler generating values for said read counter, said write counter, and said command counter by statically analyzing lines of code.

4. The method of claim 2, wherein said step of enabling said software to alter said read counter, said write counter, and said command counter further comprises a user setting values for said read counter, said write counter, and said command counter.

5. The method of claim 2, wherein said step of enabling said software to alter said read counter, said write counter, and said command counter further comprises a kernel generating values for said read counter, said write counter, and said command counter during operation.

6. The method of claim 2, wherein said step of enabling said software to alter said read counter, said write counter, and said command counter further comprises an operating system generating values for said read counter, said write counter, and said command counter during operation.

7. The method of claim 2, wherein said step of enabling said software to alter said read counter, said write counter, and said command counter further comprises an application generating values for said read counter, said write counter, and said command counter during operation.

8. The method of claim 1, further comprising:
    receiving a plurality of past commands;
    creating a set of possible arbiter states from said plurality of past commands;
    generating a second arbiter design by, for one of said plurality of past commands, associating an if-then structure with said one of said plurality of past commands; and
    loading said if-then structure into a memory to implement said second arbiter design.

9. The method of claim 8, further comprising;
    receiving requests to access said resource; and
    providing access to said resource in accordance with said second arbiter design.

10. The method of claim 9, wherein said resource comprises a system memory and wherein said step of receiving requests to access said resource further comprises receiving requests to access said system memory.

11. The method of claim 9, wherein said resource comprises a system interconnect fabric and wherein said step of receiving requests to access said resource further comprises receiving requests to access said system interconnect fabric.

12. A system for dynamically selecting an arbiter in a data processing system, said system comprising:
   means for selecting a first arbiter for current use in arbitrating between requestors for a resource;
   means, during operation of said data processing system, for detecting requests by said requestors for said resource, wherein said detecting means further comprises:
      means for detecting a plurality of diverse commands represented by said requests without regard to one or more sources of said requests,
      means for tracking requests for said resource containing a write command with a write counter, and
      means for tracking requests for said resource containing a read command with a read counter; and
   means, during operation of said data processing system, for selecting a second arbiter in response to said detected plurality of diverse commands, said means for selecting further includes:
      means for determining values of said write counter and said read counter;
      means for tracking request for said resource with a command counter;
      means for receiving an instruction to select said second arbiter and a boundary value for said command counter;
      means for calculating a ratio of said value of said read counter to a value of said write counter;
      means, in response to reaching said boundary value, for selecting a second arbiter with an ideal value of a read/write ratio approximating said ratio; and
      means, in response to said first arbiter making a transition to a new state, for implementing said second arbiter.

13. The system of claim 12, said system further comprising means for enabling software to alter said read counter, said write counter, and said command counter.

14. The system of claim 13, wherein said means for enabling said software to alter said read counter, said write counter, and said command counter further comprises means for a compiler generating values for said read counter, said write counter, and said command counter by statically analyzing lines of code.

15. The system of claim 13, wherein said means for enabling said software to alter said read counter, said write counter, and said command counter further comprises means for a user setting values for said read counter, said write counter, and said command counter.

16. The system of claim 13, wherein said means for enabling said software to alter said read counter, said write counter, and said command counter further comprises means for a kernel generating values for said read counter, said write counter, and said command counter during operation.

17. The system of claim 13, wherein said means for enabling said software to alter said read counter, said write counter, and said command counter further comprises means for an operating system generating values for said read counter, said write counter, and said command counter during operation.

18. The system of claim 13, wherein said means for enabling said software to alter said read counter, said write counter, and said command counter further comprises means for an application generating values for said read counter, said write counter, and said command counter during operation.

19. The system of claim 12, further comprising:
   means for receiving a plurality of past commands;
   means for creating a set of possible arbiter states from said plurality of past commands;
   means for generating a second arbiter design by, for one of said plurality of past commands; associating an if-then structure with said one of said plurality of past commands; and
   means for loading said if-then structure into a memory to implement said second arbiter design.

20. The system of claim 19, further comprising:
   means for receiving requests to access said resource; and
   means for providing access to said resource in accordance with said second arbiter design.

21. The system of claim 20, wherein said resource comprises means for a system memory and wherein said means for receiving requests to access said resource further comprises means for receiving requests to access said system memory.

22. The system of claim 20, wherein said resource comprises means for a system interconnect fabric and wherein said means for receiving requests to access said resource further comprises means for receiving requests to access said system interconnect fabric.

23. A computer program product in a computer-readable storage medium for dynamically selecting an arbiter in a data processing system, said computer program product comprising:
   a computer-readable storage medium;
   instructions on the computer-readable storage medium for selecting a first arbiter for current use in arbitrating between requestors for a resource;
   instructions on the computer-readable medium storage for, during operation of said data processing system, detecting requests by said requestors for said resource, wherein said detecting instructions further comprise
      instructions for detecting a plurality of diverse commands represented by said requests without regard to one or more sources of said requests,
      instructions on the computer-readable storage medium for tracking requests for said resource containing a write command with a write counter, and
      instructions on the computer-readable storage medium for tracking requests for said resource containing a read command with a read counter; and
   instructions on the computer-readable storage medium for, during operation of said data processing system, selecting a second arbiter in response to said detected plurality of diverse commands, wherein said selecting instructions further include:
      instructions on the computer-readable storage medium for determining values of said write counter and said read counter;
      instructions on the computer-readable storage medium for tracking requests for said resource with a command counter;
      instructions on the computer-readable storage medium for receiving an instruction to select said second arbiter and a boundary value for said command counter;
      instructions on the computer-readable storage medium for calculating a ratio of said value of said read counter to a value of said write counter;
      instructions on the computer-readable storage medium for, in response to reaching said boundary value, selecting a second arbiter with an ideal value of a read/write ratio approximating said ratio; and instructions on the computer-readable storage medium for, in response to said first arbiter making a transition to a new state, implementing said second arbiter.

24. The computer program product of claim 23, said computer program product further comprising instructions on the computer-readable storage medium for enabling software to alter said read counter, said write counter, and said command counter.

25. The computer program product of claim 24, wherein said instructions for enabling said software to alter said read counter, said write counter, and said command counter further comprise instructions on the computer-readable storage medium for a compiler generating values for said read counter, said write counter, and said command counter by statically analyzing lines of code.

26. The computer program product of claim 24, wherein said instructions for enabling said software to alter said read counter, said write counter, and said command counter further comprise instructions on the computer-readable storage medium for a user setting values for said read counter, said write counter, and said command counter.

27. The computer program product of claim 24, wherein said instructions for enabling said software to alter said read counter, said write counter, and said command counter further comprise instructions on the computer-readable storage medium for a kernel generating values for said read counter, said write counter, and said command counter during operation.

28. The computer program product of claim 24, wherein said instructions for enabling said software to alter said read counter, said write counter, and said command counter further comprise instructions on the computer-readable storage medium for an operating system generating values for said read counter, said write counter, and said command counter during operation.

29. The computer program product of claim 24, wherein said instructions for enabling said software to alter said read counter, said write counter, and said command counter further comprise instructions on the computer-readable storage medium for an application generating values for said read counter, said write counter, and said command counter during operation.

30. The computer program product of claim 23, further comprising:
   instructions on the computer-readable storage medium for receiving a plurality of past commands;
   instructions on the computer-readable storage medium for creating a set of possible arbiter states from said plurality of past commands;
   instructions on the computer-readable storage medium for generating a second arbiter design by, for one of said plurality of past commands, associating an if-then structure with said one of said plurality of past commands; and
   instructions on the computer-readable storage medium for loading said if-then structure into a memory to implement said second arbiter design.

31. The computer program product of claim 30, further comprising;
   instructions on the computer-readable storage medium for receiving requests to access said resource; and
   instructions on the computer-readable storage medium for providing access to said resource in accordance with said second arbiter design.

32. The computer program product of claim 31, wherein said instructions for providing access resource further comprise instructions on the computer-readable storage medium for providing access to a system memory and wherein said instructions for receiving requests to access said resource further comprises instructions on the computer-readable storage medium for receiving requests to access said system memory.

* * * * *